Oct. 20, 1942.　　A. D. CRONK ET AL　　2,299,532
FILM SPOOL
Filed Sept. 17, 1941
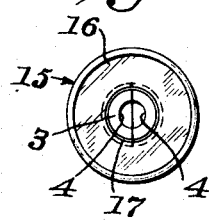
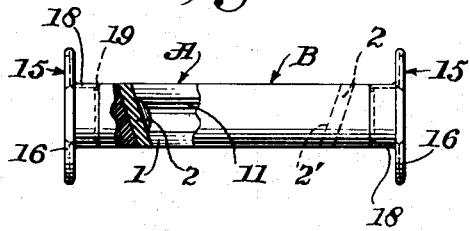
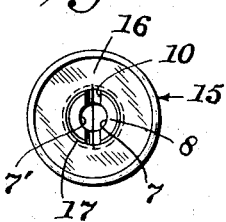
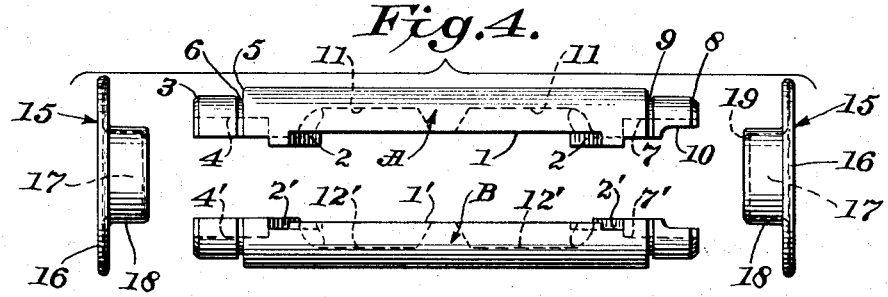
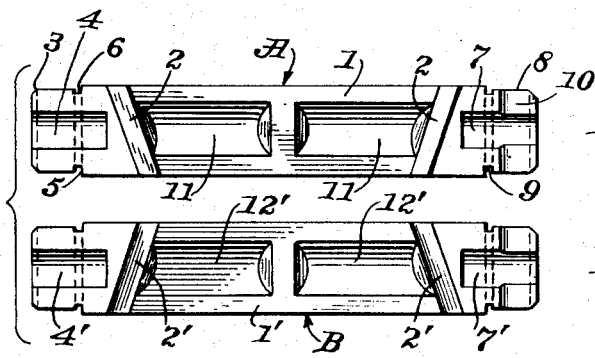
Inventors:
Adelbert D. Cronk,
David S. Hart,
By Parker Cook
Attorney.

Patented Oct. 20, 1942

2,299,532

UNITED STATES PATENT OFFICE 2,299,532

FILM SPOOL

Adelbert D. Cronk, Woodbury, and David S. Hart, Bethlehem, Conn., assignors to The Patent Button Company, Waterbury, Conn., a corporation of Connecticut Application September 17, 1941, Serial No. 411,238

2 Claims. (Cl. 242—71)

Our invention relates to a new and useful improvement in spools for roll films, and has for an object to provide a spool the spindle of which is to be made of two similar halves, and preferably molded from a thermo-setting or thermoplastic molding compound, hard rubber, or any desirable plastic material that may be readily molded in an economical manner.

Still another object of the invention is to provide a spool the spindle of which comprises two similar halves, semi-circular in cross-section, which, when placed face to face, produce a cylindrical spindle, after which the halves are permanently locked by forcing a metal end plate over the respective ends of the spindle. These metal ends, when once forced into position, become locked and cannot become disengaged from the spindle without destroying the spindle or the metal ends.

Still another object of the invention is to provide a spool the spindle of which is made from two plastic pieces which are approximately similar with the exception that when the flat faces are correctly opposed a concentric hole will appear at one end of the spindle and a concentric hole plus a key slot will appear at the other end. Also, the flat face of one of the halves of the spindle may be provided with ridges or lands and the flat face of the other half of the spindle may be provided with aligning slots, or each half may be provided with a ridge and a receptive slot, if so desired.

Also, two identical metal end pieces are to be produced, each of which has a central aperture, together with a small defining flange or hub, the edge of which is turned back on itself.

Again, near the ends of the spindle are to be two annular grooves, so that in the assembling of the spool, it is only necessary to align the two flat faces of the spindle halves and force the metal end pieces over the respective ends where the flanged rims of the end pieces will snap and hook within the groove to thus lock the halves together and lock the metal end pieces against removal.

Still another object of the invention is to provide a spool for roll films wherein the respective flat faces have a depressed central portion so that when the two halves are assembled, there will be formed a defining slot or kerf to receive the end of the film, or the paper backing about the film. Thus it will be seen that due to the fact that the two halves of the spindle are accurately made and accurately aligned, the slot will also be accurately positioned, so that when the film is once threaded within the spool, it will be in perfect aligned position to be drawn through the camera.

Still another object of the invention is to form a spindle preferably of two plastic parts—as this is a practical method of accurately positioning the kerf or slot; and furthermore, the completed spindle made from plastic is free from splinters or dust, which is always present in a wooden spindle.

With these and other objects in view, the invention consists in certain new and novel arrangements and combination of parts as will be hereinafter more fully described and pointed out in the claims.

Referring now to the drawing showing a preferred embodiment,

Fig. 1 is a view in elevation, a part being broken away for the sake of clearness, illustrating our new and improved plastic spool;

Fig. 2 is a left-end view of the same;

Fig. 3 is a right-end view;

Fig. 4 is an exploded view, showing the several parts just prior to assembling;

Fig. 5 is an inside face view of the respective halves;

Fig. 6 is a sectional view of one of the metal ends;

Fig. 7 is an enlarged fragmentary sectional view of one end of the halves assembled; and Fig. 8 is an enlarged assembly view of the parts shown in Figs. 6 and 7.

Referring now to the several views, and for the moment to Figs. 4 and 5, there may be seen the component parts of the spindle which are preferably molded from a plastic compound, as plastic has the advantage of being dust-proof and splinter-proof, and also reduces the cost of manufacture, as after the molds have once been made, the component parts of the spindle may be made in great quantities.

It will be noticed that the spindle comprises the one-half A and the similar half B, while the length will be according to the size of the film with which the spool is to be used.

In molding the spindle, and referring to the one part A, it will be noticed that there is a slightly depressed central portion 1, which is accurately defined by the angular walls 2 near the respective ends of the flat faces of the spindle.

These walls 2 are to fit into receptive slots (to be shortly mentioned) in the other half of the spindle. They also have a double function in that they not only properly align the two halves of the spindle when they are assembled, but they also act as guides for the tapered edge of the film when the same is threaded into the spindle so that the film may be wound on the spindle in the usual manner.

Also formed at the one end 3 is a semi-circular pocket 4 which extends inwardly to a point short of the depressed portion 1 that forms a part of the slot. It will also be noticed that the end 3 is slightly reduced forming the semiannular ledge 5, while at the distal end of the reduced portion and adjacent the ledge 5 is the groove 6, and it is into this groove that the turned back edge of the metal end plate is to be forced, as will be shortly mentioned.

At the other end of the spindle is a similar pocket 7, a slightly reduced end 8 and a groove 9, similar to the groove 6, and in addition, the inner face for a short distance from the end is slightly depressed as at 10.

Also, as may be noticed in the drawing, the spindle may be cored for lightness along its longitudinal axis as at 11.

Now the complementary half B has the similar chambers 4' and 7'; has the reduced ends, the grooves and all the other parts similar to the part just described, with the exception that the defining slots 2' of the depressed portion 1' extend in the opposite direction. Thus the two flat faces of the spindle are accurately aligned to receive the end pieces about to be mentioned. This half is also cored for lightness as at 12'.

As far as the specification has proceeded, it will be seen that when the two halves are placed in position with their flat faces adjacent, there is a resultant concentric hole or chamber at the one end formed by the two half chambers 4 and 4', and likewise there is a concentric chamber at the opposite end where the two half chambers 7 and 7' appear. Also at the right end there is a key slot formed by depressing the two ends of the flat faces. The key slot, of course, is to receive the cross piece of the key from the camera (not shown) so that the spindle or spool may be turned. The two end chambers respectively receive the pintles that are provided to hold the spool of film within the camera.

It will also be appreciated that the reduced portions 1 and 1' form a perfectly aligned slot, the length of which, of course, is greater on the one face (completed spindle) than on the other, which is the usual practice in camera spools. Also, there will be a perfect alignment of the film with respect to the spool.

Referring now to the end pieces 15, it will be understood that these are formed of metal and consist of the rim 16, the central aperture 17, the sleeve 18, which is turned back on itself as at 19. The diameter of the ends of the plastic spindle is slightly greater than the internal diameter of this inwardly extending flange portion at 19, but not so great but what these end pieces may be forced over the reduced ends of the spindle. Thus, when so forced and the rims slightly expanded, the rim portions 19 will hook within the respective grooves 6 and 9 formed on the reduced ends of the spindle and will hook against the shoulders of the grooves, making it impossible to remove the end pieces without destroying the assembled spindle.

The length of the reduced portions of the ends of the two halves of the spindle is approximately the width of the sleeve 18, plus the thickness of the metal rim 16, so that the plastic ends of the spindle projecting through the central apertures are about flush with the outer surfaces of the said end pieces 15.

It will be understood that the spindle made in two pieces might possibly be made of wood or might be made of moldable metal, and then locked in the manner described, but I prefer to make the spindle of a moldable plastic, due to the fact that the plastic is relatively light, free of dust or splinters, and may be molded in an economical way.

Also, when made of plastic, there is no possibility of the spindle rusting, and after the molds are once made, the halves may be turned out in great quantities in a rapid and economical manner.

Furthermore, by forming the halves of plastic and using the aligning means shown, the resultant slot will always be properly positioned, and the defining walls of the slot will tend for accuracy, which has been found lacking in the ordinary wooden spindles.

Also by using angular walls and slots to receive these walls, there is no possibility of the end of the film becoming jammed between the two halves of the spindle when the film is being threaded into position.

Also, it will be appreciated that in the present day practice of making spools of wood and using various means of putting on the end pieces, there is likely to be a considerable looseness of one or both of the end pieces, which will permit a variation in the distance between the inner faces of the two end pieces. Such a variance will cause the film to track or roll in an uneven manner, and often causes the same to jam within the camera.

With the plastic spindle and the two halves molded to strict tolerances and the end pieces locked tightly in position, not only may the tapered end of the film be accurately threaded within the tapered slot, but the film also will be held in its proper alignment between the locked end pieces of the spool throughout the unwinding of the film from the spool.

Finally, it will be understood that although we prefer to use angular walls and slots for aligning means, aligning pins and receptive holes might be used without departing from the spirit of the invention.

Having thus described our invention, what we claim as new and desire to secure by Letters Patent is:

1. A spool to be used in cameras and the like, including a molded plastic spindle formed of two substantially alike semi-cylindrical halves, the said halves having aligning means on their respective flat faces to thus hold the halves in an assembled position, each of said halves having a central portion of its flat face slightly depressed throughout its width to thus form a resultant transverse slot when the said halves are in their aligned assembled position, and the said resultant slot adapted to receive the end of a film or its backing and the respective end walls of the slot forming a guide for the said film end or its backing when passed through the said slot, concentric chambers formed in the respective ends of the spindle for the reception of pintles, the one end of the spindle also provided with a key-slot, the ends of the spindle also provided with external annular grooves, metal end pieces provided with inwardly extending rims interlocked within said grooves to thereby complete the spool and hold the halves of the spindle rigidly in their assembled position.

2. A spool to be used in cameras and the like, including a molded plastic spindle formed of two substantially alike semi-cylindrical halves, each of said halves having a central longitudinal portion of its flat face slightly depressed throughout its width to form a resultant transverse slot when the said halves are in their aligned assembled position, aligning means on the respective flat faces of the spindle halves in the form of transversely extending walls and receptive grooves, the said transverse walls and receptive grooves being coextensive with the end walls of the aforementioned depressed portions, the said resultant slot adapted to receive the end of a film or its backing and the end walls of the slot acting as a guide for the said film or its backing when passed through said slot, concentric chambers formed in the respective ends of the spindle for the reception of pintles, the one end of the spindle also provided with a key-slot, the ends of the spindle also provided with external annular grooves, metal end pieces provided with means for interlocking within said grooves to thereby complete the spool and hold the halves of the spindle rigidly in their assembled position.

ADELBERT D. CRONK.
DAVID S. HART.